US008644194B2

United States Patent
Kamath et al.

(10) Patent No.: US 8,644,194 B2
(45) Date of Patent: Feb. 4, 2014

(54) VIRTUAL SWITCHING PORTS ON HIGH-BANDWIDTH LINKS

(75) Inventors: Dayavanti Gopal Kamath, Santa Clara, CA (US); Keshav Govind Kamble, Fremont, CA (US); Dar-Ren Leu, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/273,291

(22) Filed: Oct. 14, 2011

(65) Prior Publication Data

US 2012/0093034 A1 Apr. 19, 2012

Related U.S. Application Data

(60) Provisional application No. 61/393,603, filed on Oct. 15, 2010.

(51) Int. Cl.
*H04L 12/28* (2006.01)
(52) U.S. Cl.
USPC .......................... 370/255; 370/390; 370/392
(58) Field of Classification Search
USPC .......................................... 370/255, 392, 390
See application file for complete search history.

(56) References Cited

U.S. PATENT DOCUMENTS

| 7,519,769 | B1 | 4/2009 | Kulkarni et al. |
| 7,757,059 | B1 | 7/2010 | Ofer et al. |
| 2003/0016686 | A1* | 1/2003 | Wynne et al. ................. 370/412 |
| 2006/0045089 | A1 | 3/2006 | Bacher et al. |
| 2006/0194294 | A1 | 8/2006 | Eyer et al. |
| 2007/0043860 | A1 | 2/2007 | Pabari et al. |
| 2007/0050763 | A1 | 3/2007 | Kagan et al. |
| 2007/0110078 | A1 | 5/2007 | DeSilva et al. |
| 2007/0280243 | A1 | 12/2007 | Wray |
| 2008/0043742 | A1 | 2/2008 | Pong et al. |
| 2009/0083445 | A1 | 3/2009 | Ganga |
| 2009/0157846 | A1* | 6/2009 | Shimozono et al. .......... 709/218 |
| 2010/0005234 | A1 | 1/2010 | Ganga et al. |
| 2010/0054260 | A1* | 3/2010 | Pandey et al. ............ 370/395.53 |

FOREIGN PATENT DOCUMENTS

| WO | WO2008103936 A1 | 8/2008 |
| WO | WO2009146165 A1 | 12/2009 |

* cited by examiner

*Primary Examiner* — Dang Ton
*Assistant Examiner* — Mewale Ambaye
(74) *Attorney, Agent, or Firm* — Schmeiser, Olsen & Watts, LLP

(57) ABSTRACT

Method and apparatus for managing traffic of a switch include logically partitioning a physical port of the switch into a plurality of virtual ports. One or more virtual output queues are uniquely associated with each virtual port. Switching resources of the switch are assigned to each of the virtual ports. A source virtual port is derived from a frame arriving at the physical port. The frame is placed in a given one of the one or more virtual output queues uniquely associated with the source virtual port derived from the frame. A destination virtual port for the frame is determined. The frame is transferred from the virtual output queue in which the frame is placed to an egress queue associated with the destination virtual port and forwarded from the egress queue to a destination physical port of the switch.

25 Claims, 9 Drawing Sheets

VIRTUAL SWITCHING PORTS ON HIGH-BANDWIDTH LINKS

RELATED APPLICATIONS

This application claims priority to and the benefit of U.S. Provisional Application No. 61/393,603, filed on Oct. 15, 2010, the entirety of which application is incorporated by reference herein.

FIELD OF THE INVENTION

The invention relates generally to data centers and data processing. More particularly, the invention relates to partitioning physical ports of network switches into virtual ports.

BACKGROUND

In general, a data center is a centralized facility that provides Internet and intranet services needed to support a business or an organization. A typical data center can house various types of electronic equipment, such as computers, servers (e.g., email servers, proxy servers, and DNS servers), switches, routers, data storage devices, and other associated components. Industry is currently producing switches for data centers with increasing capacity for switching packet traffic, providing their physical ports with increasing bandwidth capabilities that have grown from 10 Gbps to 40 Gbps and 100 Gbps. The network processors of such switches, however, currently manage traffic entering a switch through a given physical port as a single aggregation, irrespective of the various and diverse traffic streams passing through that physical port.

SUMMARY

In one aspect, the invention features a network switch comprising a physical port, memory configured to provide a plurality of virtual output queues and egress queues, and a network processor in communication with the virtual output queues and egress queues. The network processor includes logic configured to logically partition the physical port into a plurality of virtual ports, logic configured to assign switching resources of the switch to each of the virtual ports, logic configured to uniquely associate one or more of the virtual output queues with each virtual port, logic configured to derive a source virtual port from a frame arriving at the physical port, logic configured to place the frame in a given one of the one or more virtual output queues uniquely associated with the source virtual port derived from the frame, and logic configured to determine a destination virtual port.

The network processor further comprises logic configured to transfer the frame from the given virtual output queue in which the frame is placed to an egress queue uniquely associated with the destination virtual port, and logic configured to forward the frame from the egress queue uniquely associated with the destination virtual port to a destination physical port of the switch.

In another aspect, the invention features a method of managing traffic in a switch. The method comprises logically partitioning a physical port of the switch into a plurality of virtual ports, assigning switching resources of the switch to each of the virtual ports, uniquely associating one or more virtual output queues with each virtual port, deriving a source virtual port from a frame arriving at the physical port, and placing the frame in a given one of the one or more virtual output queues uniquely associated with the source virtual port derived from the frame. A destination virtual port for the frame is determined. The frame is transferred from the virtual output queue in which the frame is placed to an egress queue associated with the destination virtual port and forwarded from the egress queue to a destination physical port of the switch.

In still another aspect, the invention features a data center comprising a plurality of servers and a switch having a plurality of physical ports. Each server produces one or more traffic streams. Each physical port of the switch receives one or more of the traffic streams from the plurality of servers. The switch includes memory configured to provide a plurality of virtual output queues and egress queues and a network processor in communication with the virtual output queues and egress queues. The network processor includes logic configured to logically partition each physical port into a plurality of virtual ports, logic configured to assign switching resources of the switch to each of the virtual ports, logic configured to uniquely associate one or more of the virtual output queues with each virtual port, logic configured to derive a source virtual port for each traffic stream arriving at the physical ports, and logic configured to place frames belonging to each traffic stream in a given one of the one or more virtual output queues uniquely associated with the source virtual port assigned to that traffic stream.

The network processor further comprises logic configured to determine a destination virtual port for the frames belonging to each traffic stream, logic configured to transfer the frames belonging to each traffic stream from the virtual output queues in which those frames are placed to an egress queue uniquely associated with the destination virtual port determined for the frames belonging to that traffic stream, and logic configured to forward the frames belonging to each traffic stream from the egress queue uniquely associated with the destination virtual port determined for the frames belonging to that traffic stream to a destination physical port of the switch.

In yet another aspect, the invention features a computer program product for managing traffic in a switch. The computer program product comprises a computer-readable storage medium having computer-readable program code embodied therewith. The computer-readable program code comprises computer-readable program code configured to logically partition a physical port of the switch into a plurality of virtual ports, computer-readable program code configured to assign switching resources of the switch to each virtual port, computer-readable program code configured to uniquely associate one or more virtual output queues with each virtual port, computer-readable program code configured to derive a source virtual port from a frame arriving at the physical port, computer-readable program code configured to place the frame in a given one of the one or more virtual output queues uniquely associated with the source virtual port assigned to the frame, computer-readable program code configured to determine a destination virtual port for the frame.

The computer-readable program code further comprises computer-readable program code configured to transfer the frame from the virtual output queue in which the frame is placed to an egress queue associated with the destination virtual port, and computer-readable program code configured to forward the frame from the egress queue to a destination physical port of the switch.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Network switches described herein implement a mechanism for managing traffic arriving at its physical ports over high-bandwidth communication links (e.g., 40 G and 100 G Ethernet links). In brief overview, the mechanism divides each physical port coupled to a high-bandwidth communication link into multiple smaller ports, each smaller port receiving a slice of the bandwidth of the divided physical port. These smaller ports are referred to herein interchangeably either as virtual ports or as remote physical interfaces (RPIs).

Each virtual port (RPI) can operate similarly to a normal physical port directly connected to the 40 G or 100 G MAC sub-layer. Individual virtual ports can provide normal switching, routing, congestion control, QoS, filtering, and mirroring capabilities. Traffic shaping can operate on virtual ports, just as is normally done with physical ports. Virtual ports can be individually enabled or disabled, statically or dynamically. To external entities, the high-bandwidth physical port appears to be a single port, but to the switch, the physical port appears as hundreds of individually controllable virtual ports.

An advantage provided by virtual ports is that the switch is no longer constrained to handle all flows arriving on a given physical port as a single aggregation. A switch can assign a different virtual port to each type of traffic or to each separate flow of traffic arriving from a server or from virtual machines running on the server. Advantageously, this mechanism enables different treatments for the different flows, although all such traffic arrives at the switch on the same physical port. In addition, traffic conditioning, buffers, and bandwidth provisioning can occur at the virtual machine level or at the physical server level, instead of at just the physical port level.

Further, the mechanism advantageously enables a switch to support bursts of traffic at the virtual machine level by uniquely associating the traffic flow of the virtual machine with a source virtual port and switching traffic based on virtual ports. The mechanism further enables the resolution of "head of the line" blocking and congestion situations at the granularity of the virtual machine, rather than at the granularity of the server or of the physical port.

Figure 1:
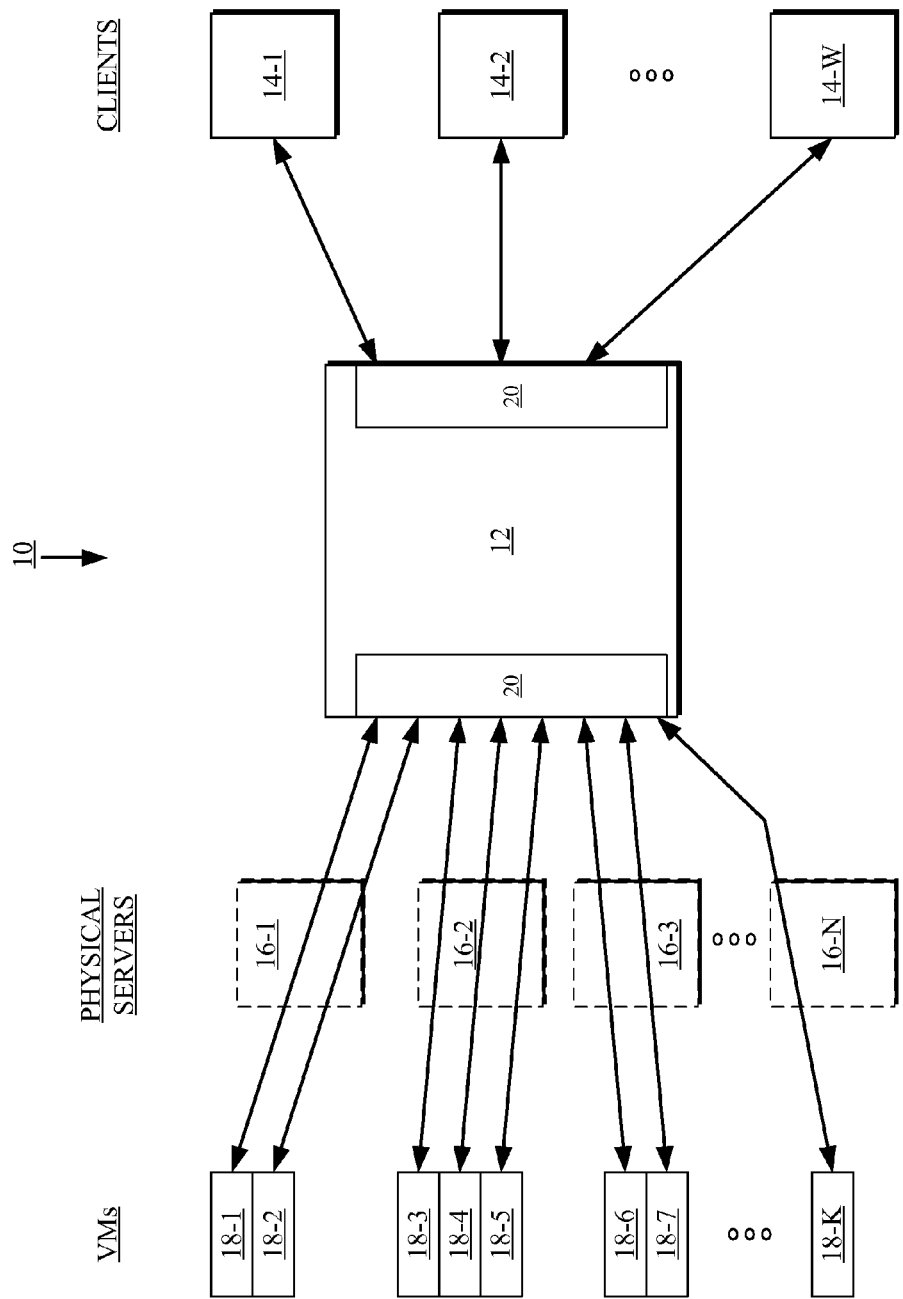
FIG. 1 is a block diagram of an embodiment of a data center or enterprise network including a switch connected between server systems and client systems.

FIG. 1 shows an embodiment of a data center 10 (or enterprise network) including a switch 12 connected to switch frames (packets) among client systems 14-1 to 14-W (generally, 14) and server systems 16-1 to 16-N (generally, 16). Each server 16 can run one or more virtual machines (VM) 18. In brief, virtual machines are a virtualization of a physical machine and its hardware components and can include a virtual processor, virtual system memory, virtual storage, and various virtual devices. The switching of frames can occur at the VM level. Accordingly, the switch 12 can perform K×W switching, where K is the number of virtual machines (e.g., greater than 1024) collectively running on the server systems 16 and W is the number of client systems 14. Within the data center 10, the switch 12 can be located at the top-of-the rack (with all servers 16 in the rack connecting to the switch) or at the end of the row (with all racks in the data center connecting to the switch). The switch 12 is capable of K×K switching in those instances where K is greater than W, and capable of W×W switching when W is greater than K.

Figure 2B:
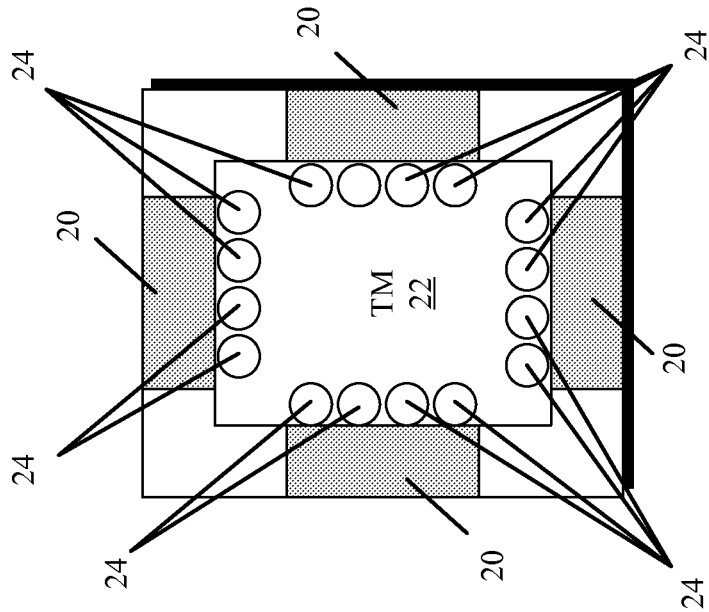
FIG. 2B is a block diagram representation of the switch of FIG. 2A configured with remote port interfaces (RPIs) (i.e., virtual ports).
Figure 2A:
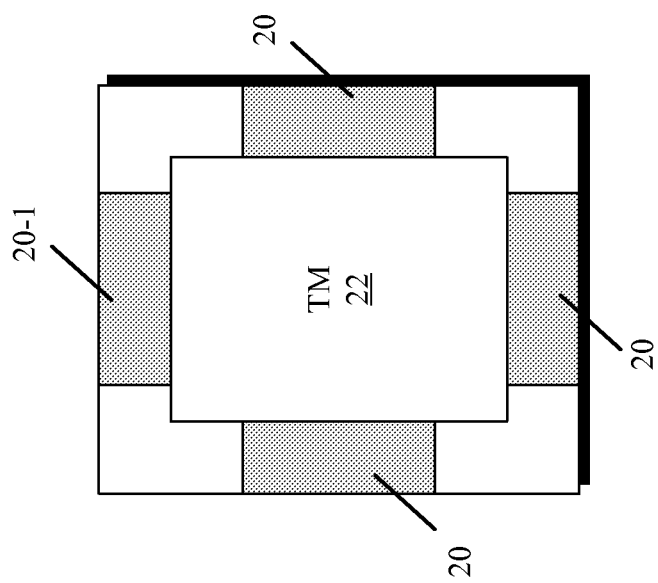
FIG. 2A is a block diagram of an embodiment of the switch.

FIG. 2A and FIG. 2B each shows an embodiment of the switch 12 having four physical ports 20 (grayed) and a traffic management (TM) module 22. In FIG. 2A, the TM module 22 manages the bandwidth of each port 20 in its entirety. For example, if physical port 20-1 has a 40 GB bandwidth, the TM module 22 manages the traffic through that port 20-1 as a whole, that is, at the granularity of the physical port level. For instance, if the port 20-1 is receiving four different traffic streams that use the full 40 Gbps bandwidth, any traffic management performed on the 40 Gbps operates on the aggregation of the streams. FIG. 2B shows the switch 12 of FIG. 2A with the TM module 22 configured with virtual ports 24. As an example, the TM module 22 partitions each of the four physical ports 20 into four virtual ports 24. The TM module 22 switches packet traffic across the 16 virtual ports 24, and can manage (e.g., shape, condition, etc.) traffic at the individual virtual port level.

A variety of techniques can be used to produce virtual ports. One technique capitalizes on the recognition that switching devices (e.g., ASICs) usually support hundreds of physical ports, although typically relatively few of the physical ports are actually used (the remainder being unused). The physical ports generally share all processing and buffering resources of the ASIC, much of which are underused because of the unused physical ports. The technique reuses the unused physical ports of the switching device (ASIC) as RPIs.

In brief overview, the switching ASIC has a network processor (NP) with packet processing capabilities. The internal TM module 22 of the switching device manages temporary buffering of incoming frames for preprocessing, and a packet processor (with ingress and egress components) determines the ingress and egress ports of each packet. The TM module 22 also manages virtual output queues (VOQ) per physical port.

Generally, if in the single port mode of FIG. 2A, all of the NP queuing bandwidth and buffers are allocated to serve one port 20 of 40 G or 100 G bandwidth. In the RPI-configured mode of FIG. 2B, the relationship between the TM module 22 and high-bandwidth physical ports 20 is purposefully severed, and replaced by a new relationship between the TM module 22 and virtual ports. Instead of generating and managing a few high-bandwidth physical ports, the TM module 22 operates to generate multiple smaller-bandwidth virtual ports. The TM module 22 achieves the virtual ports by internally dividing the resources of the switch, such as its ingress and egress queues and buffers, traditionally allocated to the physical ports, instead allocated among the multiple virtual ports. At the ingress pre-classification of packets, the network processor considers the virtual port assigned to the packets, rather than the high-bandwidth physical port through which the packets arrived, to be the ingress port. Microcode logic of the network processor determines the assigned virtual port based on information carried by certain (predetermined) fields in the packet (e.g., the S-tag in Ethernet standard packet, as described in connection with FIG. 7).

Figure 3:
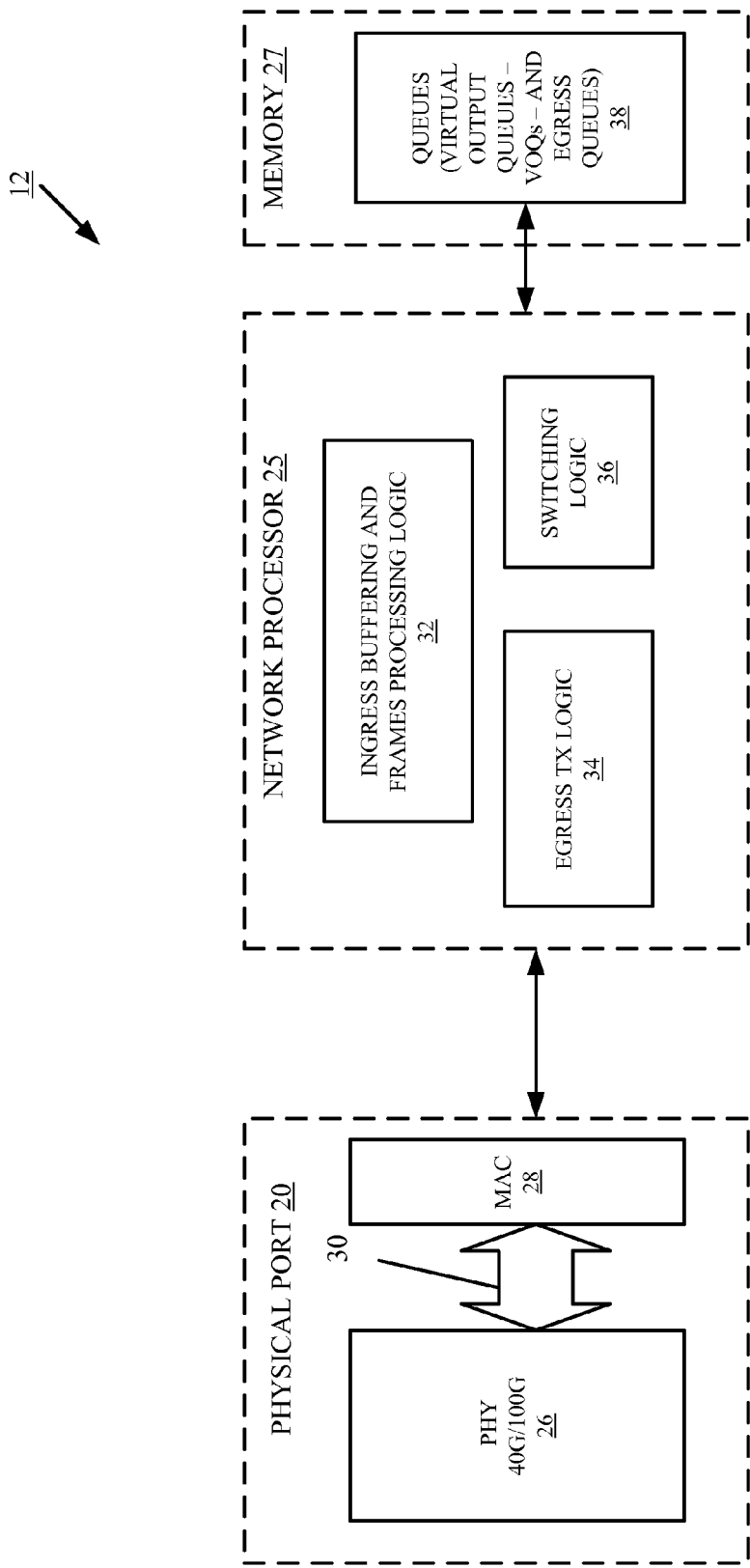
FIG. 3 is a functional block diagram of an embodiment of the switch for an Ethernet port.

FIG. 3 shows an embodiment of architecture for the switch 12 including a physical port 20 (e.g., a 40 G or 100 G Ethernet port) in communication with a network processor 25. The network processor 25 is in communication with memory 27. The physical port 20 of the switch 12 includes a PHY 26 in communication with a MAC sub-layer 28 over a plurality of serial links 30. The network processor 25 includes ingress buffering and frame processing logic 32, egress transmission logic 34, and switching logic 36. The memory 27 provides queues 38, which include ingress virtual output queues (VOQs) and egress queues. In one embodiment, the memory 27 is part of the network processor 25.

Figure 4:
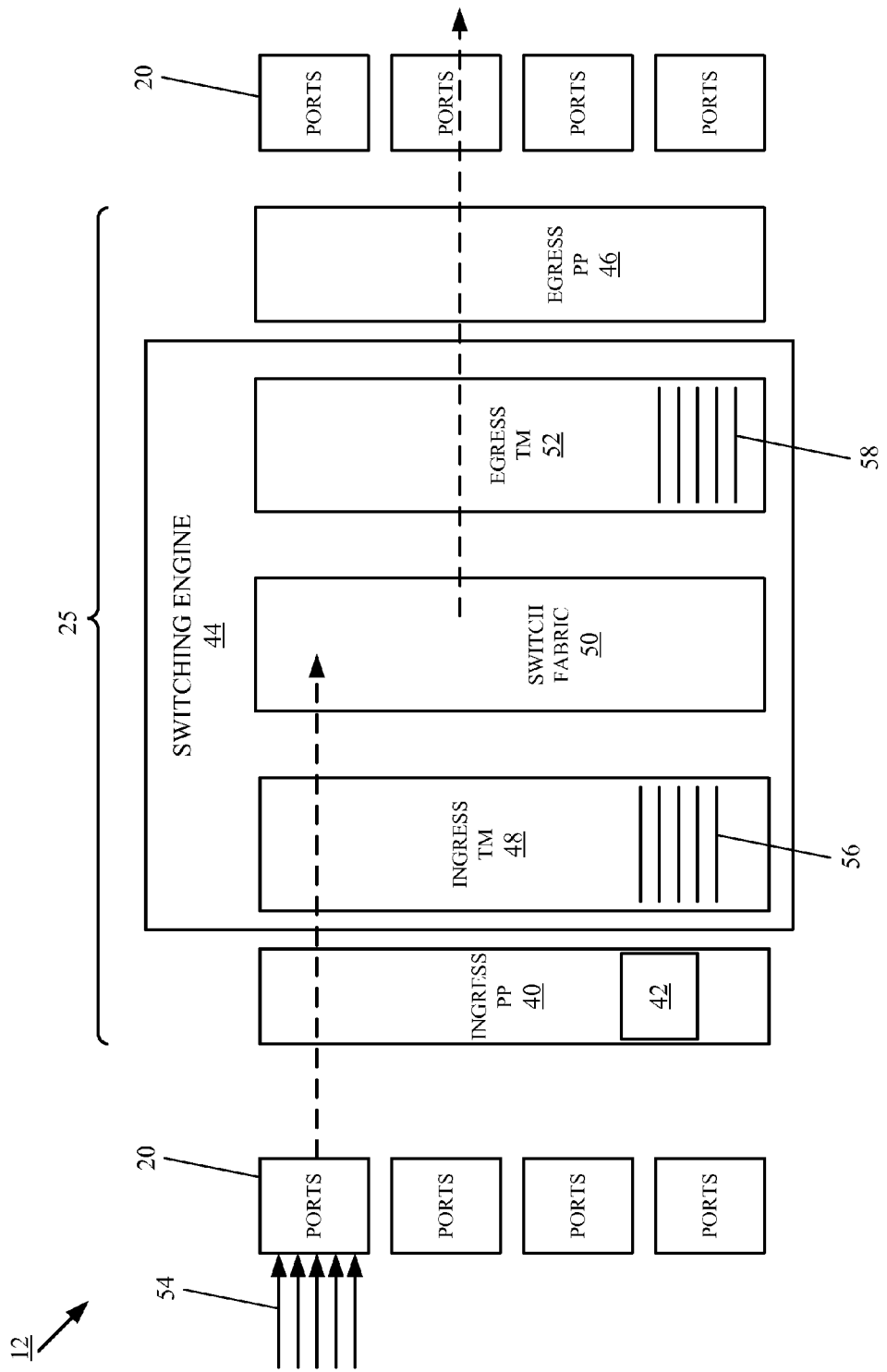
FIG. 4 is a block diagram of an embodiment of the switch.

FIG. 4 shows an embodiment of the switch 12 including the physical ports 20 and the network processor 25. In one embodiment, the network processor 25 includes a conventional switching chip that has its conventional functionality of switching packets between physical ports redirected to switching packets between virtual ports. The network processor 25 includes an ingress packet processor 40, a switching engine 44, and an egress packet processor 46. The ingress packet processor 40 includes a look-up engine 42. The switching engine 44 includes an ingress traffic manager 48, a switch fabric 50, and an egress traffic manager 52. Packets 54 arriving at the switch come through one of the physical ports 20. As examples, these physical ports 20 can have 40 G or 100 G bandwidth capabilities.

The ingress packet processor 40 generally performs conversions from physical ports 20 to virtual ports 24 (FIG. 2B). On the ingress side of the network processor 25, such virtual ports are referred to as source virtual ports. Each packet 54 arriving at a physical port 20 has a payload and a header. Based on information in the header, the ingress packet processor 40 determines the source virtual port assigned to the packet. Based on this source virtual port, the ingress packet processor 40 employs the look-up engine 42 to determine a destination physical port for the packet, and based on the destination physical port, a destination virtual port for the packet (on the egress side of the network processor, virtual ports are referred to as destination virtual ports). The ingress packet processor 40 adds a pre-classification header to each packet. The pre-classification header carries information about the source virtual port. In one embodiment, the pre-classification header includes, but is not limited to, fields for the source virtual port, the source VLAN, a QoS for the packet, statistics pointers, and the destination virtual port.

The ingress traffic manager (TM) 48 generates ingress queues 56 (also referred to as VOQs) for the incoming packets or frames. The ingress queues 56 are illustrated as horizontal lines within the ingress TM 48. Each ingress queue 56 is uniquely associated with one of the source virtual ports 24, and used exclusively for that source virtual port. The ingress TM 48 is independently programmable (i.e., microcode loaded through a microcode facility) to perform various traffic control operations (e.g., priority, buffering, traffic shaping and/or conditioning) based on the source virtual ports of the packets. The ingress TM 48 moves each packet (or a pointer to that packet) to one of the ingress queues 56 based on the source virtual port in the pre-classification header of that packet.

The switch fabric 50 takes the packets from the ingress queues 56 and switches them to the egress traffic manager (TM) 52 based on the pre-classification header contents. The egress TM 52 generates egress queues 58. Like the ingress TM 48, the egress TM 52 is independently programmable (i.e., microcode loaded through a microcode facility) to perform various traffic control operations (e.g., priority, buffering, traffic shaping and/or conditioning) based on the destination virtual ports of the packets.

The egress packet processor 46 performs conversions from destination virtual ports to physical ports 20, taking packets from the egress queues 58 and forwarding them to their destination physical ports based on the destination virtual ports. The egress packet processor 46 may remove the pre-classification header from each packet before forwarding that packet to a destination physical port (or the destination physical port can remove the pre-classification header).

In the transfer of packets from the ingress queues 56 to the egress queues 58, the ingress and egress packet processors 40, 46 engage in a handshaking process. The ingress packet processor 40 signals to the egress packet processor 46 that it has a packet for transfer. In response, the ingress packet processor 40 receives credit. When sufficient credit is acquired, the ingress packet processor 40 sends the packet to the egress packet processor 46.

Figure 5:
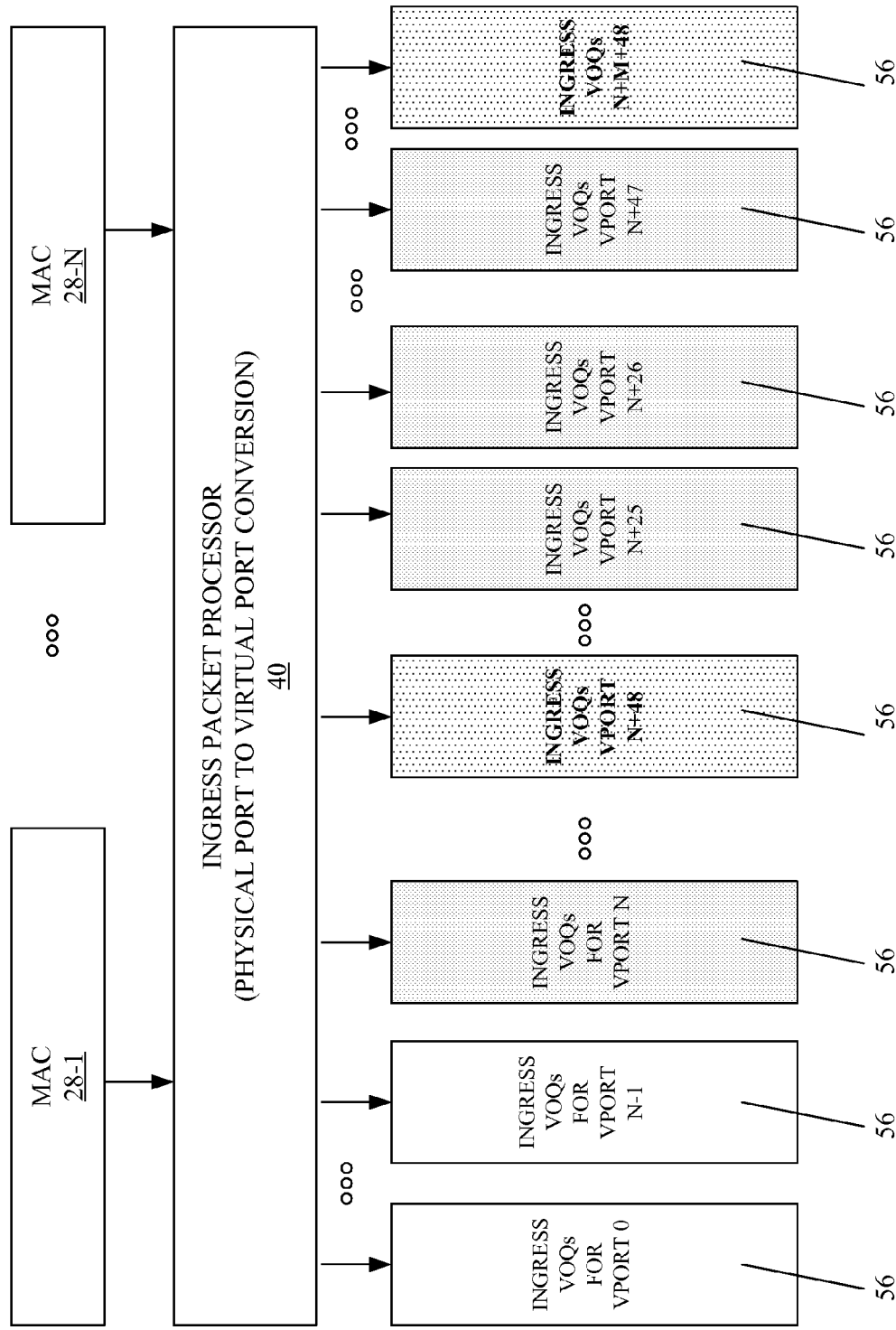
FIG. 5 is a functional block diagram of an embodiment of ingress components of the switch of FIG. 4.

FIG. 5 shows an embodiment of ingress components of the switch 12 of FIG. 4. The switch 12 has N physical ports 20 (represented by MAC 28-1 through MAC 28-N), each of which operates at a high bandwidth, for example, 40 Gbps or 100 Gbps or greater. Each physical port 20 can be connected, for example, to another switch, to a port extender, or to a server (which can dynamically run a number of virtual machines). The physical ports 20 are in communication with the ingress packet processor 40, which performs a physical port to virtual port conversion on incoming packets.

The switch 12 allocates a number of virtual ports for each of the N physical ports 20 of the switch (called local physical ports), a number of virtual ports for remote physical ports (corresponding to those physical ports of a port extender or of an edge switch), and a number of virtual ports for each of the M virtual machines on the servers. Accordingly, there are three types of virtual ports (RPIs): those allocated for local physical ports; those allocated for remote physical ports; and those allocated for virtual machines. The virtual ports for the local physical ports are generated statically, those for the remote physical ports can be generated statically or dynamically, and those for the virtual machines are generated dynamically. Static virtual port generation occurs at boot time of the switch in accordance with a configuration file. Dynamic virtual port generation occurs during the run time of the switch using virtualization protocols and based on requirements.

In addition, the switch 12 divides the resources of each physical port 20 among the virtual ports allocated for that physical port. As part of the division of resources, each virtual port has its own ingress virtual output queues 56 and its own egress queues 58. In FIG. 5, there are, for example, N VOQs 56 allocated for local physical ports, 48 VOQs 56 allocated for remote physical ports (grayed), and M VOQs 56 allocated for virtual machines (dotted). The traffic managers (TMs) of the switch can control the number of each type of virtual port. The ingress packet processor 40 is in communication with each of the VOQs 56 to transfer packets thereto in accordance with the virtual ports assigned to the packets.

Figure 6:
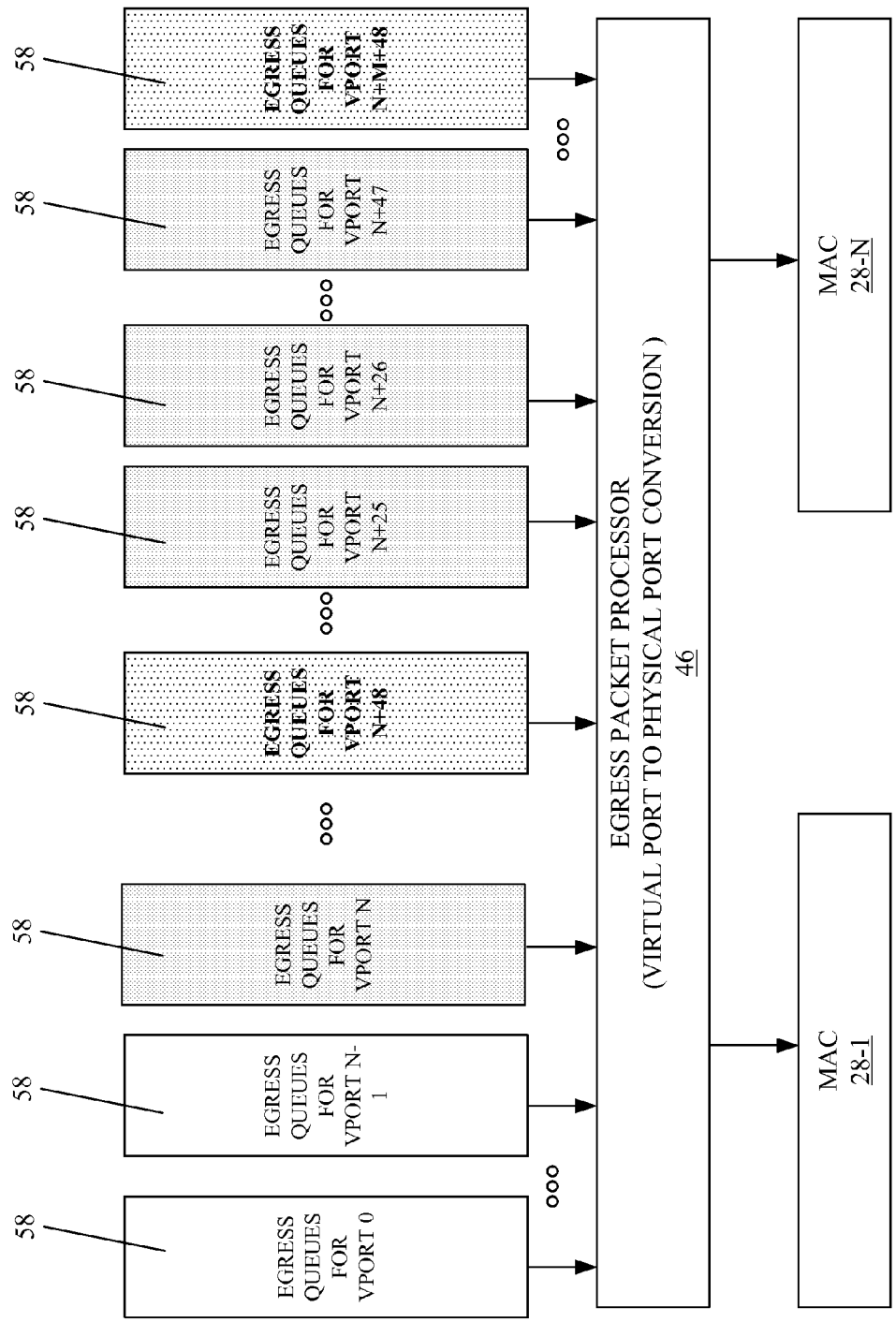
FIG. 6 is a functional block diagram of an embodiment of egress components of the switch of FIG. 4.

FIG. 6 shows an embodiment of egress components of the switch of FIG. 4, including the egress queues 58 in communication with the egress packet processor 46. Each virtual port is assigned its own egress queues 58. At appropriate moments, packets of a given virtual port that are presently residing in VOQs 56 are transferred to the egress queues 58 allocated to that given virtual port. The egress packet processor 46 then performs a virtual port to physical port conversion on the packets and forwards the packets to one of the destination physical ports (represented by MAC 28-1 through MAC 28-N).

Figure 7:
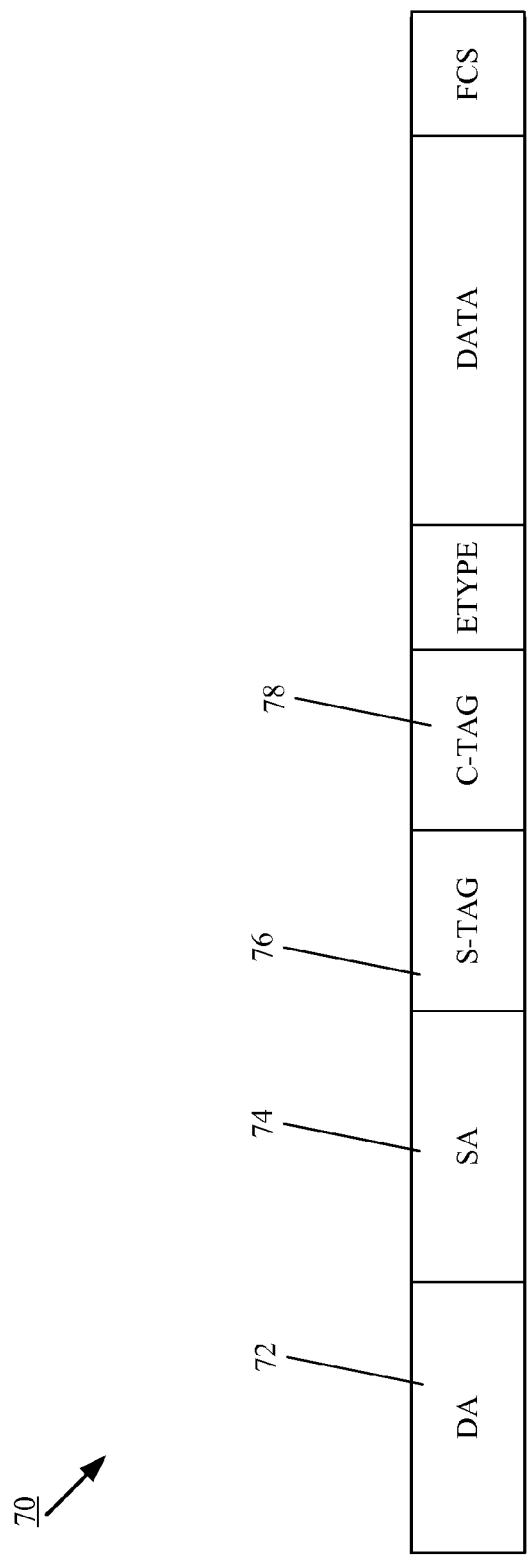
FIG. 7 is a diagram of an embodiment of an Ethernet packet that can be used to carry RPI-identifying information.

FIG. 7 shows an embodiment of an Ethernet packet 70 that can be used to carry RPI-identifying information. In general, one or more of the fields of the Ethernet packet, whether taken alone or in combination, can associate the packet to a particular virtual port. Here, for example, the Ethernet packet 70 includes a destination address field 72, a source address field 74, an S-tag field 76, and a C-tag. In one embodiment, the S-tag field 76 can be used to identify the virtual port. In this embodiment, use of the S-tag field 76 enables a high-bandwidth switch to manage high-port bandwidth between S-tag-based ports and to switch between S-tag-based ports. Alternatively, the destination address 72 can serve to identify the virtual port, or the destination address 72 in combination with the source address 74 can provide the RPI-identifying fields.

Figure 8:
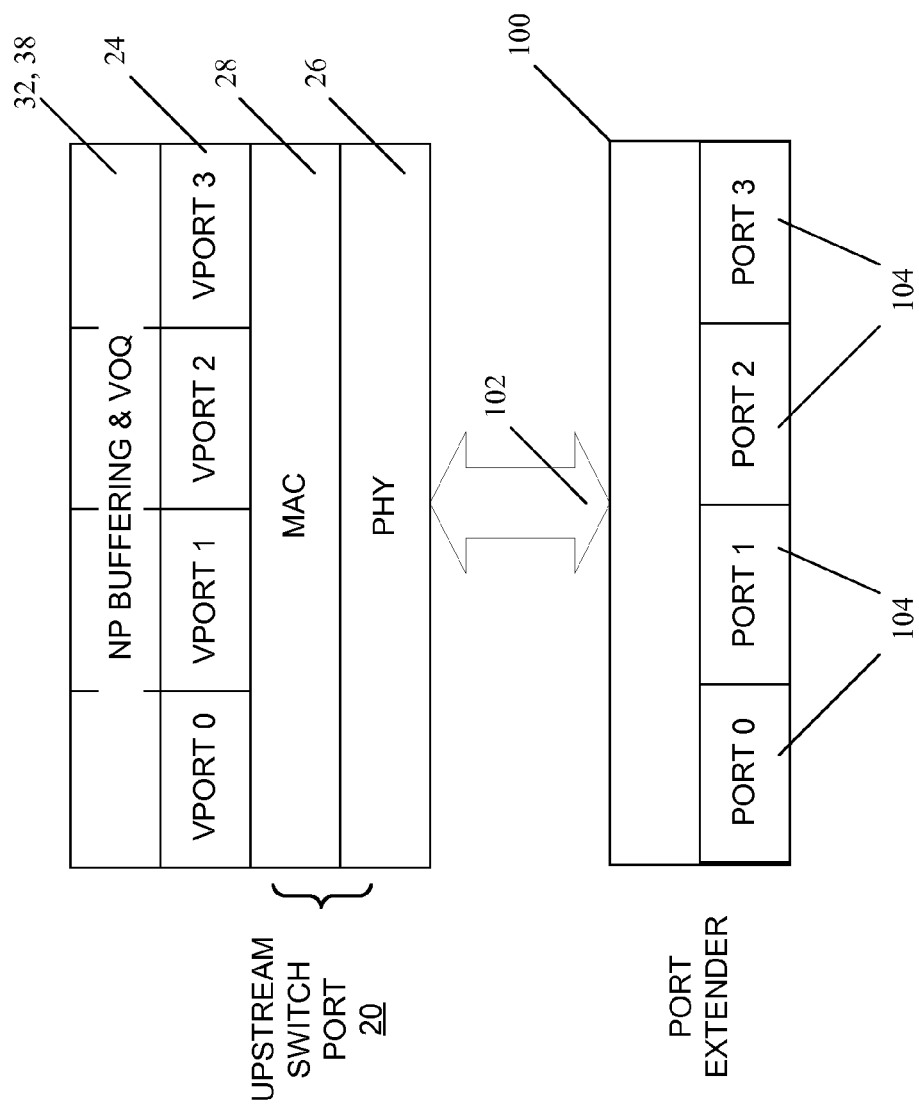
FIG. 8 is a diagram of an embodiment of a port extender connected to a physical port of the network switch.

A port extender can further the advantages of virtual ports. FIG. 8 shows an embodiment of a port extender 100 connected to a physical port 20 of the switch 12 over a high-bandwidth communication link 102. The port extender 100 has a plurality of ports 104. The switch 12 includes the PHY layer 26, MAC sub-layer 28, and NP buffering and VOQs 32, 38. In this example, the physical port 20 has been partitioned into four virtual ports 24.

During operation, the port extender 100 tags all frames arriving at its ports 104 with additional information, which represents their port of entry into the port extender 100 (a similar tagging occurs when the downstream device is an edge switch, rather than a port extender). The port extender 100 forwards the tagged frames over the communication link 102 to the (upstream or parent) switch 12.

At the switch 12, all the frames physically appear to be arriving on the single physical port 20. The microcode of the network processor pre-classifies the frames, determining the virtual port assigned to the frames, based on the tagged port information. The virtual port can be decided either by using the tagged information in the frame or by looking at certain other combinations of fields in the frame, as mentioned in connection with FIG. 7. The switch 12 subsequently treats the virtual port assigned to the frame as though it is the physical ingress port of that frame. A search of the forwarding table lookup 42 (FIG. 5) for the destination address produces a virtual port as the destination port. The microcode of the egress packet processor 46 can overwrite the packet field in the frame (e.g. the s-tag field in an Ethernet frame) with this destination virtual port. Eventually, the egress packet processor 46 processes the frame based on the properties of the destination virtual port. The network processor forwards the frames from the egress queues 58 allocated to the destination virtual port to a destination physical port.

Figure 9:
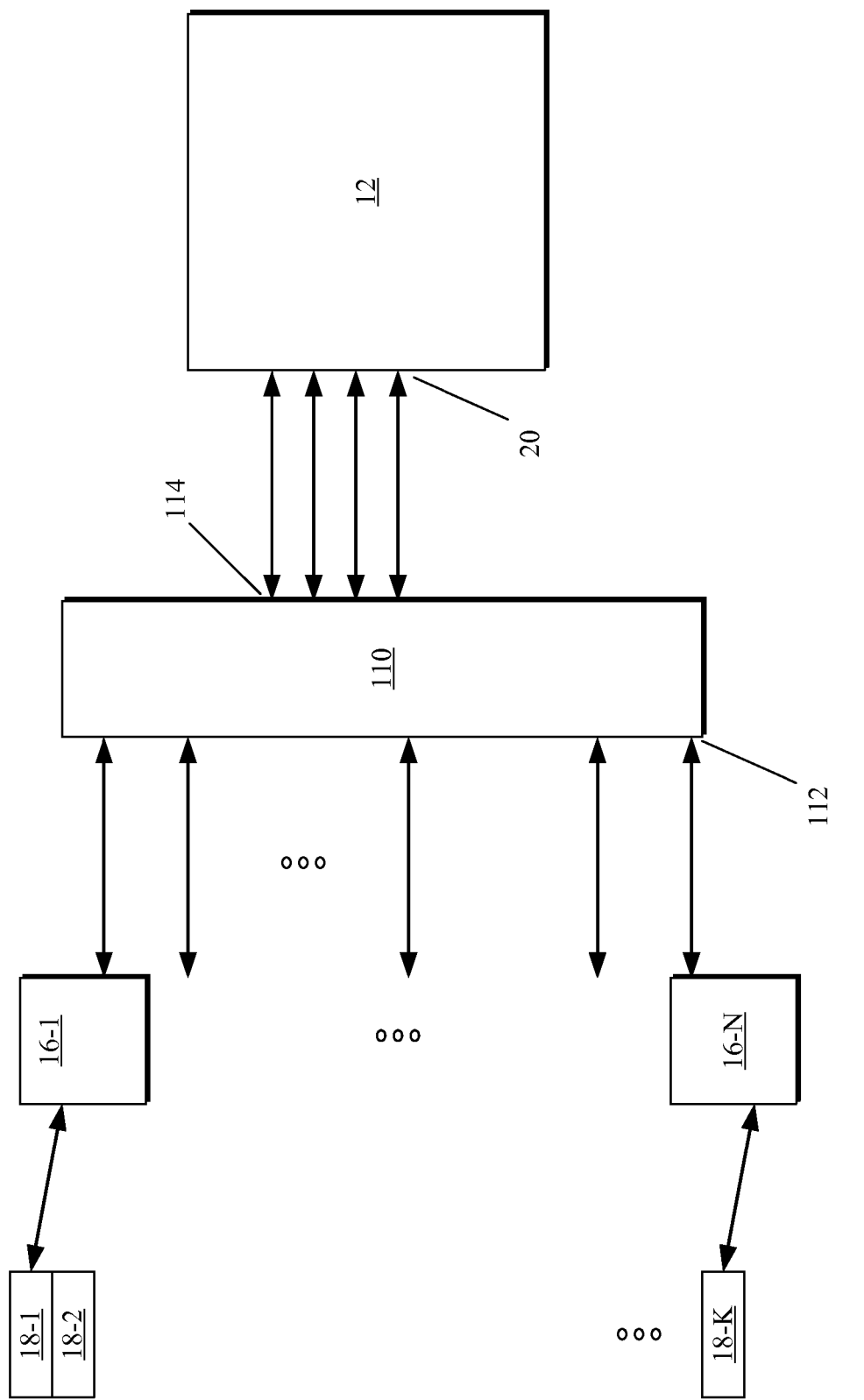
FIG. 9 is a functional block diagram of an embodiment of a port extender connected to the physical ports of the network switch.

FIG. 9 shows another example of the use of a port extender 110. In this example, the port extender 110 has 48 low-bandwidth (i.e., 1 Gbps) ports 112, each connected to a different server system 16. Each server system 16 has its own remote physical ports and can run one or more virtual machines 18. The port extender 110 also has four high-bandwidth (e.g., 40 Gbps) ports 114, each connected to one of four physical ports 20 of the switch 12. The port extender 110 aggregates the traffic from the server systems 16 arriving on the low-bandwidth ports 112 and sends the aggregated traffic out through the four physical ports 114 to the high-bandwidth ingress ports 120 of the switch 12.

The switch 12 can assume complete control over the remote physical ports 112 of the port extender 110 by assigning a virtual port to each of them. The switch 12 also assigns a virtual port to each VM 18 running on a server system 16 connected to a remote physical port 112. In this example, the switch 12 can switch traffic either at the server level or at the VM-level because each has been assigned a separately manageable virtual port. Based on the virtual ports, the switch buffers and switches this traffic for transmission over four egress ports.

Because each remote physical port 112 on the port extender 110 is assigned a virtual port within the switch 12, the remote physical ports 112 inherit all those features provided by the virtual ports. For example, if IP routing is enabled for a given virtual port inside the switch 12, the traffic arriving at this switch from the remote physical port 112 assigned to this given virtual port is routed accordingly. The given virtual port thus operates on behalf of the remote physical port 112 to which the virtual port is assigned and provides services to corresponding packets coming through that remote physical port 112. The individual port properties of queuing, buffering, filtering, traffic shaping, and all layer 2 to layer 7 level protocols and functionality are inherited by the remote physical ports 112 of the port extender 110.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A switch comprising:
   a physical port;
   memory configured to provide a plurality of virtual output queues and egress queues; and
   a network processor in communication with the virtual output queues and egress queues, the network processor including:
      logic configured to logically partition the physical port into a plurality of source virtual ports and destination virtual ports;
      logic configured to assign switching resources of the switch to each of the virtual ports;
      logic configured to uniquely associate one or more of the virtual output queues with each source virtual port;
      logic configured to derive a source virtual port from a frame arriving at the physical port;
      logic configured to place the frame in a given one of the one or more virtual output queues uniquely associated with the source virtual port derived from the frame;
      logic configured to determine for the frame a destination physical port based on the source virtual port and a destination virtual port based on the destination physical port;
      logic configured to transfer the frame from the given virtual output queue in which the frame is placed to an egress queue uniquely associated with the destination virtual port; and
      logic configured to forward the frame from the egress queue uniquely associated with the destination virtual port to the destination physical port of the switch.

2. The switch of claim 1, wherein the network processor further comprises logic configured to manage traffic at a virtual port granularity.

3. The switch of claim 1, wherein one of the virtual ports is assigned to a virtual machine running on a server connected to the physical port.

4. The switch of claim 1, wherein one of the virtual ports is assigned to a remote physical port.

5. The switch of claim 1, wherein the network processor further comprises logic configured to derive the source virtual port from the frame based on one or more of tagged information, a source MAC address, fields in an Ethernet header, and fields in a Layer 3 protocol header included within the frame upon arrival at the physical port.

6. The switch of claim 1, wherein the network processor further comprises logic configured to add to the frame a pre-classification header including the destination virtual port for the frame.

7. The switch of claim 1, wherein the network processor further comprises logic configured to handle traffic microbursts at a virtual machine granularity.

8. The switch of claim 1, wherein the network processor further comprises logic configured to handle head-of-the-line blocking at a virtual machine granularity.

9. The switch of claim 1, wherein the network processor further comprises logic configured to assign one of the virtual ports to a remote physical port of a port extender connected to the physical port and to provision the virtual port assigned to the remote physical port with resources and features of the switch.

10. A method of managing traffic in a switch, comprising:
    logically partitioning a physical port of the switch into a plurality of virtual ports;
    assigning switching resources of the switch to each of the virtual ports;
    uniquely associating one or more virtual output queues with each source virtual port;
    deriving a source virtual port from a frame arriving at the physical port;
    placing the frame in a given one of the one or more virtual output queues uniquely associated with the source virtual port derived from the frame;
    determining a destination physical port based on the source virtual port, and determining a destination virtual port for the frame based on the destination physical port;
    transferring the frame from the virtual output queue in which the frame is placed to an egress queue associated with the destination virtual port; and
    forwarding the frame from the egress queue to a destination physical port of the switch.

11. The method of claim 10, further comprising managing traffic in the switch at a virtual port granularity.

12. The method of claim 10, further comprising assigning one of the virtual ports to a virtual machine running on a server connected to the physical port.

13. The method of claim 10, further comprising assigning one of the virtual ports to a remote physical port.

14. The method of claim 10, further comprising deriving the source virtual port from the frame based on one or more of tagged information, a source MAC address, fields in an Ethernet header, and fields in a Layer 3 protocol header included within the frame upon arrival at the physical port.

15. The method of claim 10, further comprising adding to the frame a pre-classification header including the destination virtual port for the frame.

16. The method of claim 10, further comprising handling traffic microbursts at a virtual machine granularity.

17. The method of claim 10, further comprising handling head-of-the-line blocking at a virtual machine granularity.

18. The method of claim 10, further comprising assigning one of the virtual ports to a remote physical port of a port extender connected to a physical port of the switch; and provisioning the virtual port assigned to the remote physical port with resources of the switch, wherein the remote physical port of the port extender inherits the resources and features of the switch provisioned to the virtual port assigned to the remote physical port.

19. A data center comprising:
    a plurality of servers, each server producing one or more traffic streams;
    a switch having a plurality of physical ports, each physical port receiving one or more of the traffic streams from the plurality of servers, the switch including memory configured to provide a plurality of virtual output queues and egress queues and a network processor in communication with the virtual output queues and egress queues, the network processor including:
       logic configured to logically partition each physical port into a plurality of source virtual ports and a plurality of destination virtual ports;
       logic configured to assign switching resources of the switch to each of the virtual ports;
       logic configured to uniquely associate one or more of the virtual output queues with each source virtual port;
       logic configured to derive a source virtual port for each traffic stream arriving at the physical ports;
       logic configured to place frames belonging to each traffic stream in a given one of the one or more virtual output queues uniquely associated with the source virtual port derived from that traffic stream;

logic configured to determine for the frames belonging to each traffic stream a destination physical port based on the source virtual port, and to determine a destination virtual port based on the destination physical port for the frames belonging to each traffic stream;

logic configured to transfer the frames belonging to each traffic stream from the virtual output queues in which those frames are placed to an egress queue uniquely associated with the destination virtual port determined for the frames belonging to that traffic stream; and logic configured to forward the frames belonging to each traffic stream from the egress queue uniquely associated with the destination virtual port determined for the frames belonging to that traffic stream to destination physical port of the switch.

20. The data center of claim 19, further comprising a port extender connected to the physical ports of the switch, the port extender being disposed between the plurality of servers and the switch to pass the traffic streams produced by the servers through to the switch, and wherein the network processor of the switch further comprises logic configured to assign virtual ports to remote physical ports of the port extender and to provision the virtual ports assigned to the remote physical ports with resources and features of the switch, whereby the remote physical ports of the port extender inherit the resources and features of the switch provisioned to those assigned virtual ports.

21. The data center of claim 20, wherein the port extender adds tagged information to the traffic streams passed through from the servers to the switch, the tagged information added to each traffic stream representing a port of entry into the port extender for that traffic stream.

22. The data center of claim 19, wherein one or more of the servers runs one or more virtual machines on a hypervisor, each virtual machine producing one or more of the traffic streams received by the physical ports of the switch, the hypervisor of each virtual machine being assigned one of the virtual ports.

23. The data center of claim 19, wherein the switch is a first switch, and further comprising a second switch connected to one of the physical ports of the first switch, the second switch being disposed between the plurality of servers and the first switch to switch the traffic streams produced by the servers to the first switch, and wherein the network processor of the switch further comprises logic configured to assign virtual ports to remote physical ports of the second switch and to provision the virtual ports assigned to the remote physical ports of the second switch with resources and features of the first switch, whereby the remote physical ports of the second switch inherit the resources and features of the first switch provisioned to those assigned virtual ports.

24. The data center of claim 20, wherein the second switch adds tagged information to the traffic streams switched from the servers to the second switch, the tagged information added to each traffic stream representing a port of entry into the second switch for that traffic stream.

25. A computer program product for managing traffic in a switch, the computer program product comprising:

a non-transitory computer-readable storage medium having computer-readable program code embodied therewith, the computer-readable program code comprising:

computer-readable program code configured to logically partition a physical port of the switch into a plurality of source virtual ports and destination virtual ports;

computer-readable program code configured to assign switching resources of the switch to each virtual port;

computer-readable program code configured to uniquely associate one or more virtual output queues with each source virtual port;

computer-readable program code configured to derive a source virtual port from a frame arriving at the physical port;

computer-readable program code configured to place the frame in a given one of the one or more virtual output queues uniquely associated with the source virtual port derived from the frame;

computer-readable program code configured to determine for the frame a destination physical port based on the source virtual port, and to determine a destination virtual port based on the destination physical port;

computer-readable program code configured to transfer the frame from the virtual output queue in which the frame is placed to an egress queue associated with the destination virtual port; and computer-readable program code configured to forward the frame from the egress queue to the destination physical port of the switch.

* * * * *